United States Patent [19]
Giering et al.

[11] Patent Number: 5,520,267
[45] Date of Patent: May 28, 1996

[54] ACTUATING DEVICE WITH AUTOMATIC READJUSTMENT OF DISC BRAKES, ESPECIALLY FOR TRUCKS AND BUSES

[75] Inventors: Wilfried Giering, Mendig; Franz-Helmut Holl, Mastershausen, both of Germany

[73] Assignee: Lucas Industries public limited company, Solihull, United Kingdom

[21] Appl. No.: 307,789

[22] PCT Filed: Nov. 8, 1994

[86] PCT No.: PCT/EP93/01101

§ 371 Date: Sep. 30, 1994

§ 102(e) Date: Sep. 30, 1994

[87] PCT Pub. No.: WO93/22579

PCT Pub. Date: Nov. 11, 1993

[30] Foreign Application Priority Data

May 5, 1992 [DE] Germany ............................ 9206051 U
Jun. 29, 1992 [DE] Germany ............................ 9208699 U

[51] Int. Cl.$^6$ .................................................. F16D 55/08
[52] U.S. Cl. ........................................ 188/72.9; 188/72.7
[58] Field of Search ............................... 188/71.7–71.9, 188/72.7–72.9, 106 F, 196 D, 196 V

[56] References Cited

U.S. PATENT DOCUMENTS

| | | | |
|---|---|---|---|
| 3,805,924 | 4/1974 | Gambardella | 188/71.9 |
| 3,848,704 | 11/1974 | Falk | 188/196 V |
| 4,154,321 | 5/1979 | Falk | 188/71.9 |
| 4,256,206 | 3/1981 | Maehara | 188/71.9 |
| 4,697,671 | 10/1987 | Stewart et al. | 188/72.9 |
| 4,727,963 | 3/1988 | Villata | 188/196 D |
| 4,923,036 | 5/1990 | Margetts | 188/71.9 |
| 4,981,197 | 1/1991 | Antony et al. | 188/71.9 |
| 5,086,884 | 2/1992 | Gordon et al. | 188/71.9 |

Primary Examiner—Robert J. Oberleitner
Assistant Examiner—Chris Schwartz
Attorney, Agent, or Firm—Oblon, Spivak, McClelland, Maier & Neustadt

[57] ABSTRACT

A first threaded member is supported for rotation about a screw axis (C; C'; C") parallel to the axis (A) of a brake disc in a casing which is disposed axially next to the brake disc when in built-in position. A second threaded member is fixed against rotation and connected to the first threaded member by a readjustment thread pair so that the two threaded members together form a longitudinally adjustable tappet for exerting an actuating force on a brake pad. A rotary member is rotatable about an axis of rotation (B) of its own which extends at least approximately parallel to the brake disc, for axially displacing the tappet by means of an actuator member. A gear connection is provided between the rotary member and the first threaded member, comprising an angle drive and a coupling arrangement to transmit a limited torque for readjustment of the brake pad mentioned.

10 Claims, 8 Drawing Sheets

ACTUATING DEVICE WITH AUTOMATIC READJUSTMENT OF DISC BRAKES, ESPECIALLY FOR TRUCKS AND BUSES

BACKGROUND OF THE INVENTION

The instant invention relates to an actuating device as recited in the precharacterizing part of claim 1.

DISCUSSION OF THE BACKGROUND

Such an actuating device is known from German Utility Model 91 15 195. It comprises a lever-shaped actuator member which is fastened to an axial extension of a rotary member protruding out of the casing of the actuating device in a direction parallel to the axis of rotation of the brake disc.

Actuating devices of the generic kind in question usually are operated by a pneumatic diaphragm cylinder which must be rather large since it has to operate not only a service brake but also a parking brake. With some axle designs it is difficult, sometimes even impossible, to accommodate a large diaphragm cylinder at a place suitable for actuating the rotary member of the known actuating device.

SUMMARY OF THE INVENTION

It is, therefore, the object of the invention to improve an actuating device of the generic type specified, with automatic readjustment on a disc brake, so that it can transmit a clamping force sufficiently great for heavy vehicles, such as trucks and buses, and yet requires only little space.

The object is met, in accordance with the invention, by the features recited in claim 1.

BRIEF DESCRIPTION OF THE DRAWINGS

Further developments are presented in the subsidiary claims.

Embodiments of the invention will be explained in greater detail below, with reference to diagrammatic drawings, in which.

DESCRIPTION OF THE PREFERRED EMBODIMENTS

The disc brake illustrated in FIGS. 1 to 5 is associated with an internally ventilated brake disc 10 and includes a brake carrier member 12 on which a floating caliper 14 is guided for displacement parallel to axis A of the brake disc 10. The guide means are embodied by two sleeves 16, each secured to the carrier member 12 by a bolt 18 with hexagonal recessed hole and protected against contamination by bellows 20. The floating caliper 14 encloses two brake pads 22 and 24 adapted to be urged each of the brake disc 10 and, as usual, each including a backplate to which a friction lining is attached. For replacement, the brake pads 22 and 24 can be pulled out upwardly through an aperture in the floating caliper 14, upon loosening of retainer pins 26.

Figure 1:
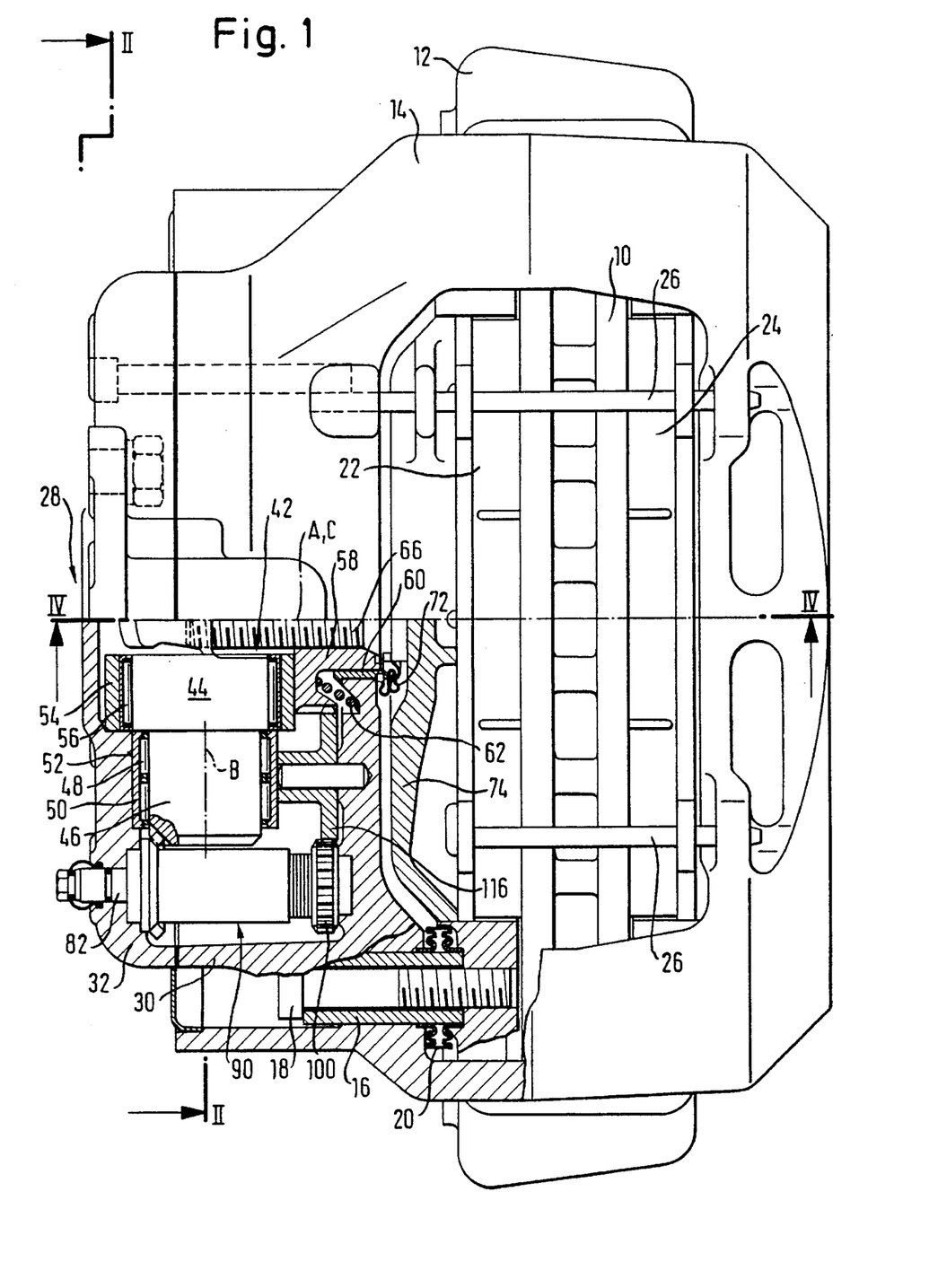
FIG. 1 shows a disc brake including an actuating device in top plan view, partly in section I—I of FIG. 2.
Figure 2:
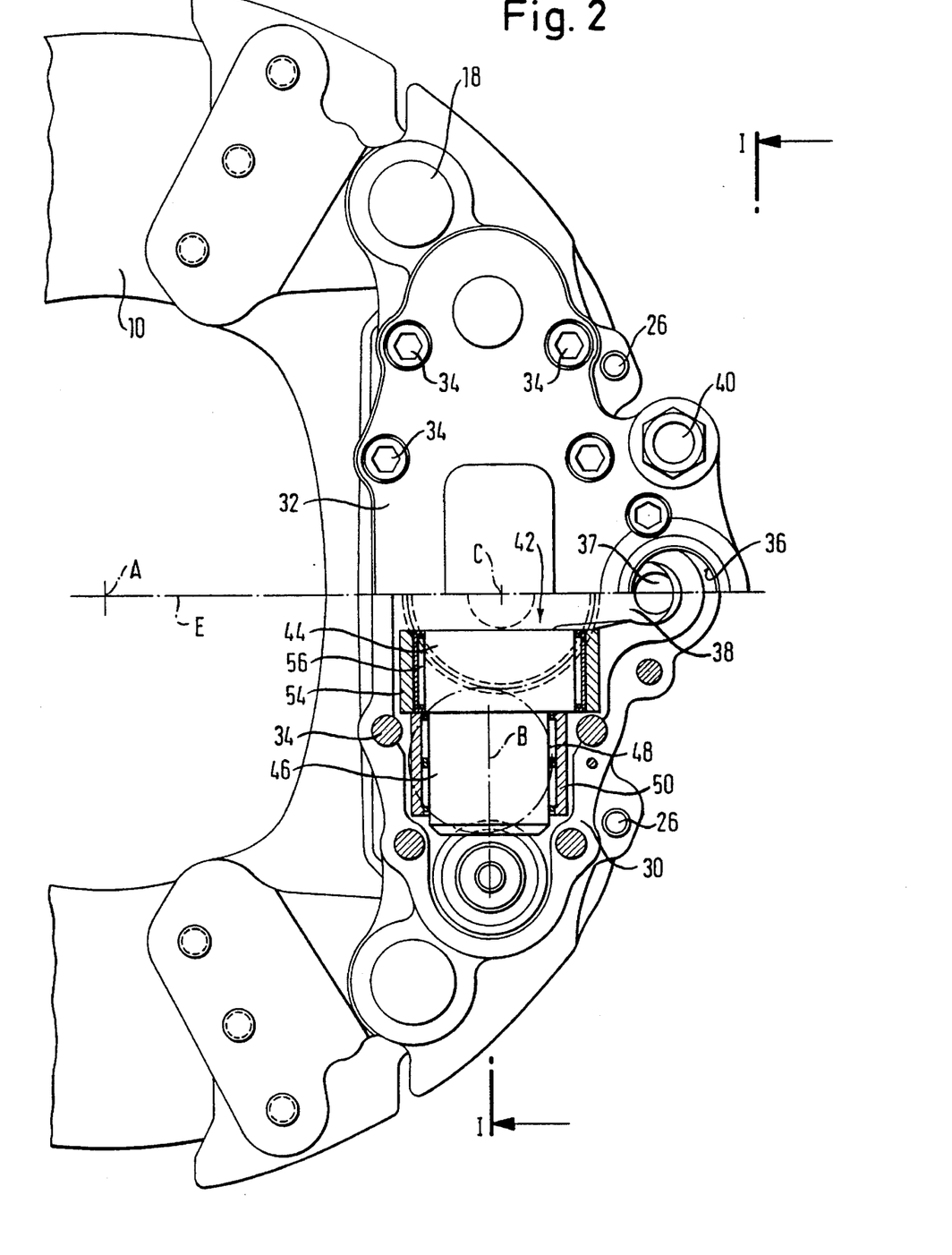
FIG. 2 is the lateral view of the brake shown in half section II—II in FIG. 1.

A brake actuating device 28 is provided to actuate the left brake pad in FIG. 1, i.e. the inner brake pad 22 as regards the arrangement of the brake in a vehicle, to urge this brake pad to the right in FIG. 1 against the brake disc 10. Forces of reaction result as the inner brake pad 22 is urged into contact with the brake disc 10, and these reactive forces displace the floating caliper 14 to the left in FIG. 1, thereby pressing also the outer brake pad 24 which is supported on the floating caliper 14 against the brake disc 10.

Figure 4:
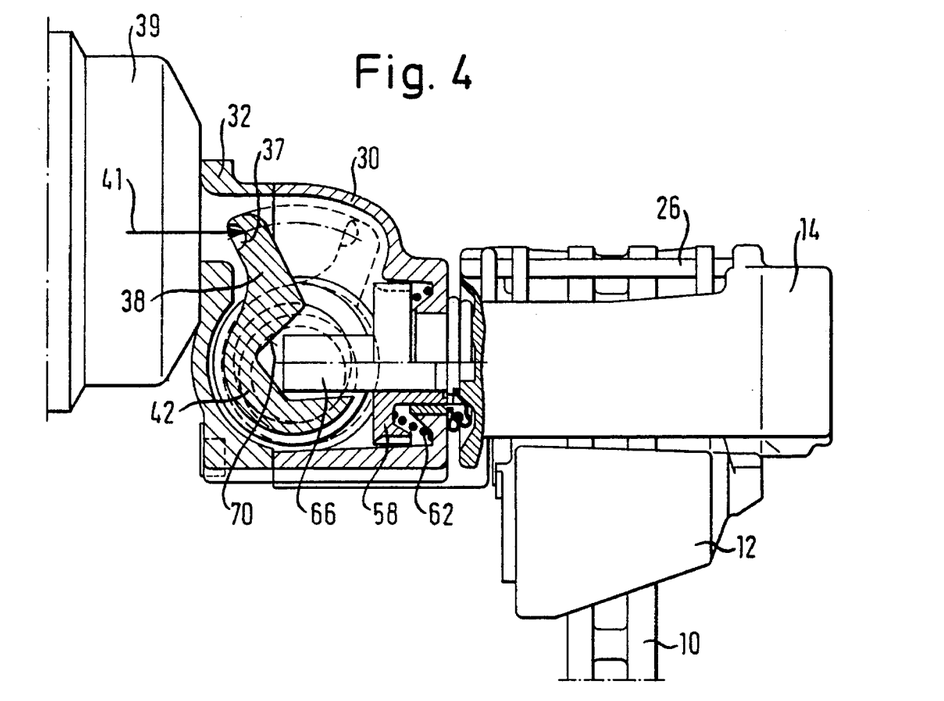
FIG. 4 is the front view of the brake shown partly as section IV—IV in FIG. 1.
Figure 5:
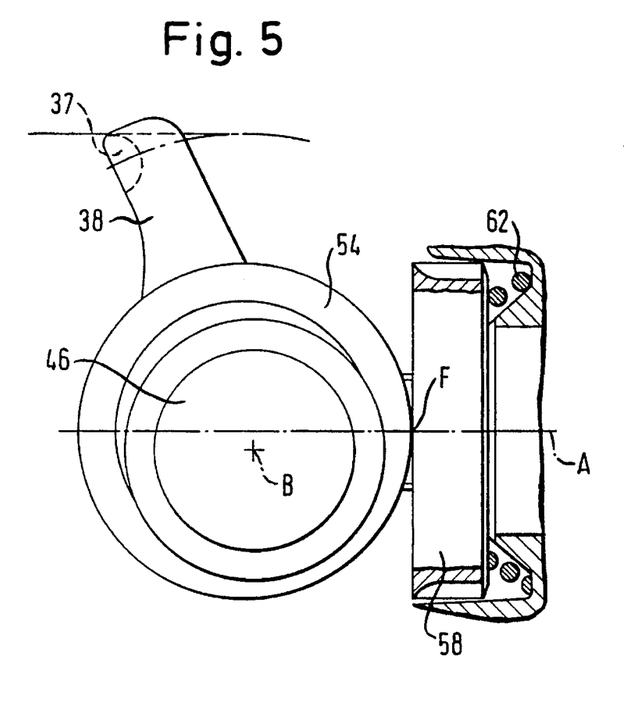
FIG. 5 is an enlarged cutout of FIG. 4.

The actuating device 28 comprises a casing 30 formed in one piece with the floating caliper 14 in the embodiment shown here. A cover 32 is fastened to the casing 30 by screws 34. In the cover 32 of the casing a round aperture 36 is left open which offers access to an end of a lever-like actuator member 38 which end is formed with a depression 37. Close to its aperture 36, the cover 32 of the casing is formed with two projections each having a fastening hole 40 for screw connection of a diaphragm cylinder 39 which is of conventional structure and therefore indicated only diagrammatically in FIG. 4. The diaphragm cylinder 39 includes a tappet 41 which presses against the actuator member 38 in the depression 37 so as to turn the actuator member in clockwise sense, as indicated in FIGS. 4 and 5.

The actuator member 38 is an integral part of a rotary member 42 which is enclosed by the casing 30 and its cover 32. Pivoting of the actuator member 38 causes the rotary member 42 to turn about an axis of rotation B which is perpendicular to the axis A of the brake disc and intersects the same at a distance. The rotary member 42 is substantially symmetrical with respect to a plane of symmetry E which lies perpendicularly, i.e. at right angles to the axis of rotation B and includes the axis A of the brake disc. At either side of the plane of symmetry E an eccentric 44 with an adjacent journal pin 46 each are formed. The rotary member 42 has an eccentric 44 and a journal pin 46. The eccentric 44 is surrounded by a needle bearing 56 having an outer ring 54. The two journal pins 46 each are supported in a needle bearing 48, and the needle bearings include an outer ring 50 each for support in a corresponding depression 52 formed in the cover 32 of the casing.

By an outer ring 54 of a needle bearing 56 each, the two eccentrics 44 press against a rear end surface, remote from the brake disc 10, of a first sleeve-like threaded member 58 which is supported by means of a sliding sleeve 60 in a through bore of the casing 30 so as to be rotatable about a screw axis C parallel to the axis A of the brake disc and biased by a conical compression spring 62 in a direction away from the brake disc 10. The compression spring 62 is clamped between the casing 30 and a flange 64 of the first threaded member 58.

The first threaded member 58, together with a mushroom-shaped second threaded member 66 screwed into the first threaded member, constitutes a tappet which has a self-locking, irreversible readjustment thread pair 68 for axial adjustment of the brake pad 22. The end of the second threaded member 66 remote from the brake pad 22 projects into a central recess 70 formed in the rotary member 42. The axial space requirement of the actuating device 28 is small due to this arrangement and particularly due to the parallel disposition of the rotary member 42 with respect to the brake disc 10. A bellows 72 serving as a means of protection against contamination is fastened to the sliding sleeve 60 and the second threaded member 66.

As may be seen in FIG. 1, a plate 74 is positioned between the second threaded member 66 and the brake pad 22 to make sure that brake actuating forces are distributed uniformly, this plate being axially movable with respect to the brake carrier member 12 but fixed against rotation by guide elements provided at the carrier member 12. The threaded member 66 is fixed against rotation at the plate 74.

Upon pressurizing of the diaphragm cylinder 39, its tappet 41 will exert a force on the actuator member 38 directed approximately parallel to the screw axis C, as seen in FIG. 4, thereby generating a torque with respect to the axis of rotation B so that the rotary member 42 will be turned in clock-wise sense, as seen in FIG. 5. The outer rings 54 of the needle bearings 56 mounted on the two eccentrics 44 transmit the forces resulting from rotation of the rotary member 42 substantially without any wear to the first threaded member 58 which they each contact in a line-shaped area of contact F. The area of contact F may lie slightly above or below the screw axis C, depending on the position of the rotary member 42.

By virtue of the self-locking effect of the readjustment thread pair 68, the second threaded member 66 and, together with it, the plate 74 take part in the axial displacement of the first threaded member 58 so that the inner brake pad 22 will be engaged with the brake disc 10. The resulting forces of reaction are introduced into the casing 30 by way of the cover 32 thereof and cause the floating caliper to shift, to the left in FIGS. 1 and 3, whereby the outer brake pad 24 too is urged against the brake disc 10.

Figure 3:
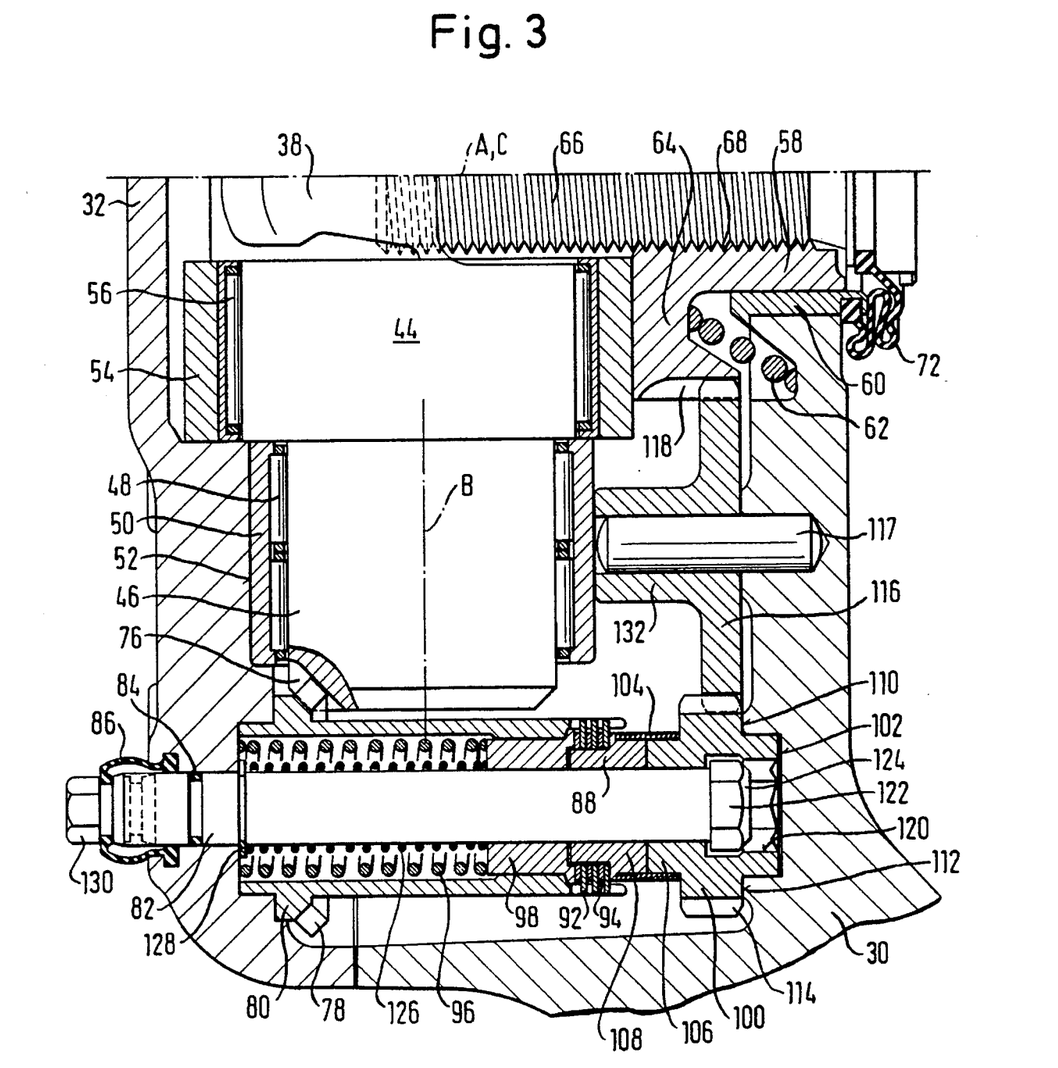
FIG. 3 is an enlarged cutout of FIG. 1.

The lower journal pin 46 in FIGS. 1 and 3 is formed with bevel teeth 76 at its lower end for meshing engagement with bevel teeth 78 provided at a sleeve 80. This means that the rotary member 42 is connected to the sleeve 80 by an angle drive. As an alternative, the angle drive could be embodied by worm or helical tooth pairings.

The sleeve 80 is rotatably supported in the cover 32 of the casing, spaced from and parallel to the screw axis C, and encloses a return shaft 82 supported in the cover 32 of the casing where it is sealed by a sealing ring 84 and a sealing collar 86. Just like another sleeve 88 supported on the return shaft 82, the sleeve 80 belongs to a coupling arrangement 90 which further comprises a multiple disc clutch including discs 92 and 94. The discs 92 are connected so as to rotate together with the toothed sleeve 80, while the discs 94 rotate together with the sleeve 88. Clearance is provided between the discs 94 and the sleeve 88 for a certain angle of rotation which determines the brake release clearance.

The stack of discs 92, 94 is biased axially by a compression spring 96 clamped between the casing 30 and a pressure ring 98 mounted on the return shaft 82. As a consequence, rotation of the toothed sleeve 80 is transmitted to the sleeve 88 by means of friction lock by the multiple discs 92, 94, as long as a certain torque is not exceeded.

The sleeve 88 is followed in axial direction by a pinion 100 which is rotatably supported in a recess 102 formed in the casing 30 and which is connected to the coupling sleeve 88 by a helical wrap spring 104 wrapping corresponding coupling portions 106 and 108 of the pinion 100 and sleeve 88, respectively, without any radial clearance. The wrap spring 104 is wound such that it tightens in the rotational direction of actuation, thereby taking along the pinion 100, whereas it opens when the coupling sleeve 88 is rotated back. The wrap spring 104, together with the two coupling portions 106 and 108, thus presents a free-wheeling slip clutch which transmits torque from the sleeve 88 to the pinion 100 in the operating direction of rotation only, while it allows the sleeve 88 to be turned back without the pinion 100.

The pinion 100 has an annulus-shaped end surface 110 which the force of the compression spring 96 normally holds in engagement with an abutment surface 112 formed at the casing 30 so that the pinion 100 is prevented by friction from any unintentional rotation.

The pinion 100 meshes with the toothing 114 of an intermediate gear 116 which is rotatably supported on a pin 117 disposed in the casing 30 and which engages in external teeth 118 formed on the first threaded member 58. The pinion 100 is formed with an inner hexagon 120 which is associated with an outer hexagon 122 formed at the return shaft 82. The two hexagons 120 and 122 can be mutually engaged by axial displacement of the return shaft 82, the engagement being facilitated by a cone 124 formed at one end of the return shaft 82. Another, weaker compression spring 126 is arranged around the return shaft 82, radially inside the compression spring 96, and clamped between the pressure ring 98 and a locking ring 128 fixed on the return shaft 82. In this manner the return shaft 82 is biased so that normally its outer hexagon 122 will not engage in the inner hexagon 120.

When the brake is actuated, rotation of the rotary member 42 caused by the pivoting of the actuator member 38 is converted by the angle drive formed by the two bevel toothings 76 and 78 into rotation of the sleeve 80. Once the rotational clearance mentioned has been overcome between the discs 94 and the sleeve 88, a torque will act first on the sleeve 88 and further, via the wrap spring 104, on the pinion 100 and finally on the first threaded member 58 by way of the intermediate gear 116 and the external toothing 118. The threaded member, however, will not rotate if the brake release clearance, usually being approximately 0.5 mm, already has been overcome by the above mentioned rotational clearance so that the two brake pads 22 and 24 have engaged the brake disc 10 which consequently transmits a reactive force, in correspondence with the actuating force, to the two eccentrics 44 through the tappet formed by the two threaded members 58 and 66. The friction occurring in the readjustment thread pair 68 on that occasion is greater than the torque which the coupling 98 can transmit.

Now, if the rotational clearance between the discs 94 and the sleeve 88 is overcome upon actuation of the brake and the brake pads 22 and 24 do not reach the brake disc 10 to give rise to a corresponding reactive force, rotation of the sleeve 80 will be transmitted through the stack of discs 92, 94 to the sleeve 88 and on through the wrap spring 104 to the pinion 100 and finally to the first threaded member 58 which consequently will be turned in the sense that the tappet it presents together with the second threaded member 66 becomes longer.

Upon release of the brake, the rotational movement of the rotary member 42, now in the opposite sense, is transmitted to the sleeve 80 but not further on to the pinion 100 because, with this direction of rotation, the wrap spring 104 opens and thus prevents the pinion 100 from accompanying the rotational movement.

Adjustment procedures of the kind specified above cause the second threaded member 66 to be gradually threaded more and more out of the first threaded member 58 during the lifetime of the brake pads 22 and 24. When the brake pads 22 and 24 have reached their limit of wear and need to be replaced, the two threaded members 58 and 66 must be screwed into each other once more until they have reached their starting position which is illustrated in the drawings. To accomplish that, the return shaft 82 is moved axially to the right in FIGS. 1 and 3 against the force of the compression spring 126 until the outer hexagon 122 engages in the inner hexagon 120. Thereupon the pinion 100 and, through intermission of the intermediate gear 116, the first threaded member 58 can be turned together with the return shaft 82, for example, by means of a wrench placed on the outer end, formed as a hexagon 130, of the return shaft 82. At this time, the plate 74 continues to prevent the second threaded member 66 from rotating.

As soon as the return shaft 82 is released, the compression spring 126 will move it back into the starting position illustrated in which the outer hexagon 122 no longer engages in the inner hexagon 120 of the pinion 100.

The intermediate gear 116 includes a hub 132 having a front end face which presents an abutment surface for the outer ring 50 of the needle bearing 48 when the rotary member 42 is built into the casing 30. The two threaded members 58 and 66 are screwed into each other as far as possible to accomplish the assembly. Upon mounting of the cover 32 of the casing and tightening of the screws 34 the brake is actuated several times, whereby the second threaded member 66 becomes unscrewed a bit from the first threaded member 58 and the compression spring 62 presses the flange 64 of the first threaded member 58 against the outer rings 54 of the two needle bearings 56. In this manner the rotary member 42 is retained finally in its normal position in which the outer rings 50 of the two needle bearings 48 each lie in the corresponding one of the two depressions 52.

The disc brake illustrated in FIGS. 6 to 10 largely corresponds to the disc brake described above and shown in FIGS. 1 to 5. Differences do exist in details of the actuating device 28:

Other than in FIGS. 1 to 5, two adjustable tappets are provided in the casing 30 of the actuating device according to FIGS. 6 to 10. Each of these tappets comprises a first threaded member 58 and a second threaded member 66 and the tappets are disposed at either side of the plane of symmetry E, parallel to and spaced from the same. The two second threaded members 66 are interconnected by a thin metal plate 133 so that they cannot rotate, the metal plate at the same time serving as a heat shield.

Figure 6:
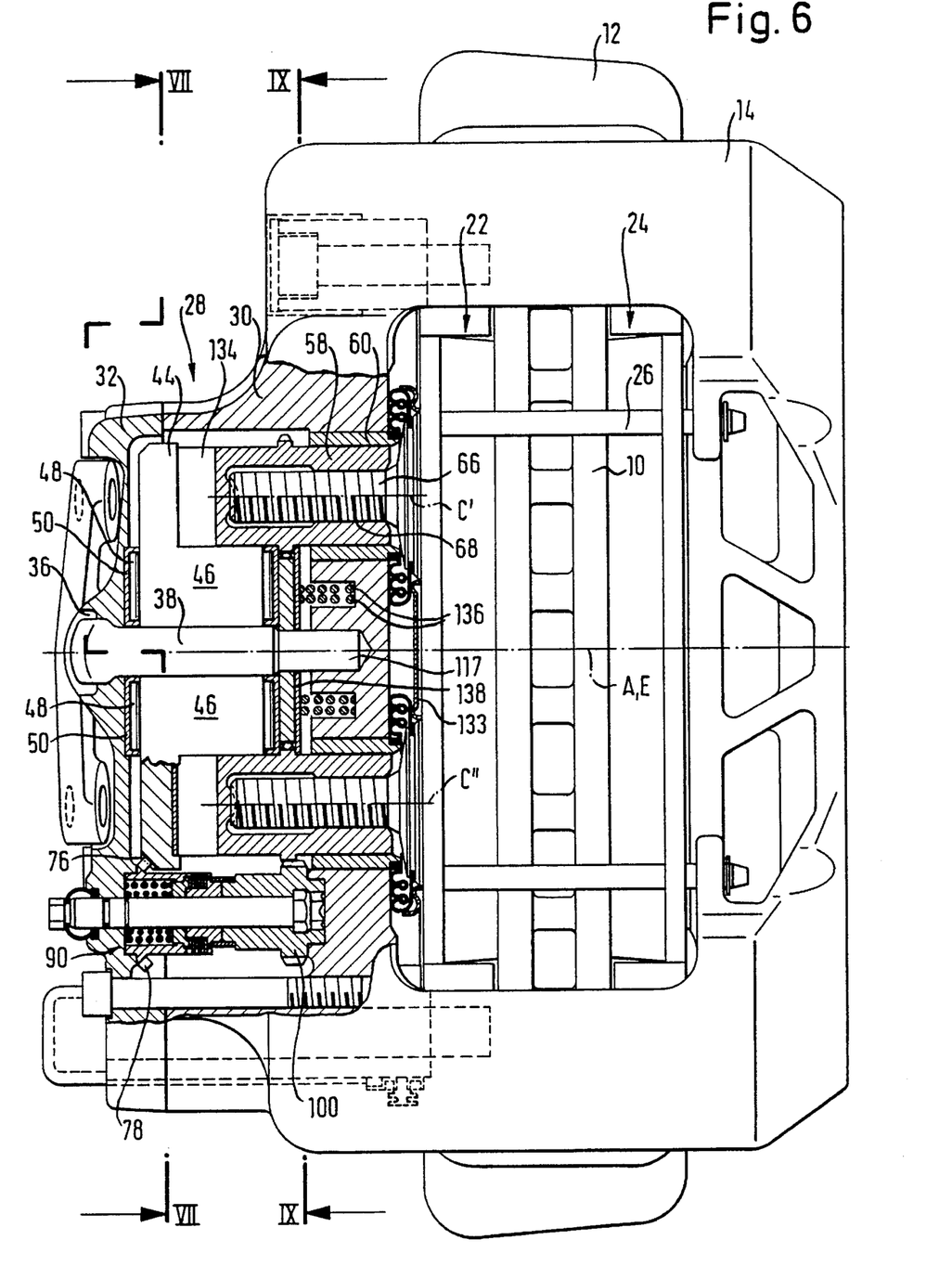
FIG. 6 is a top plan view corresponding to FIG. 1 of a disc brake with a modified actuating device, shown partly as section VI—VI in FIG. 7.
Figure 7:
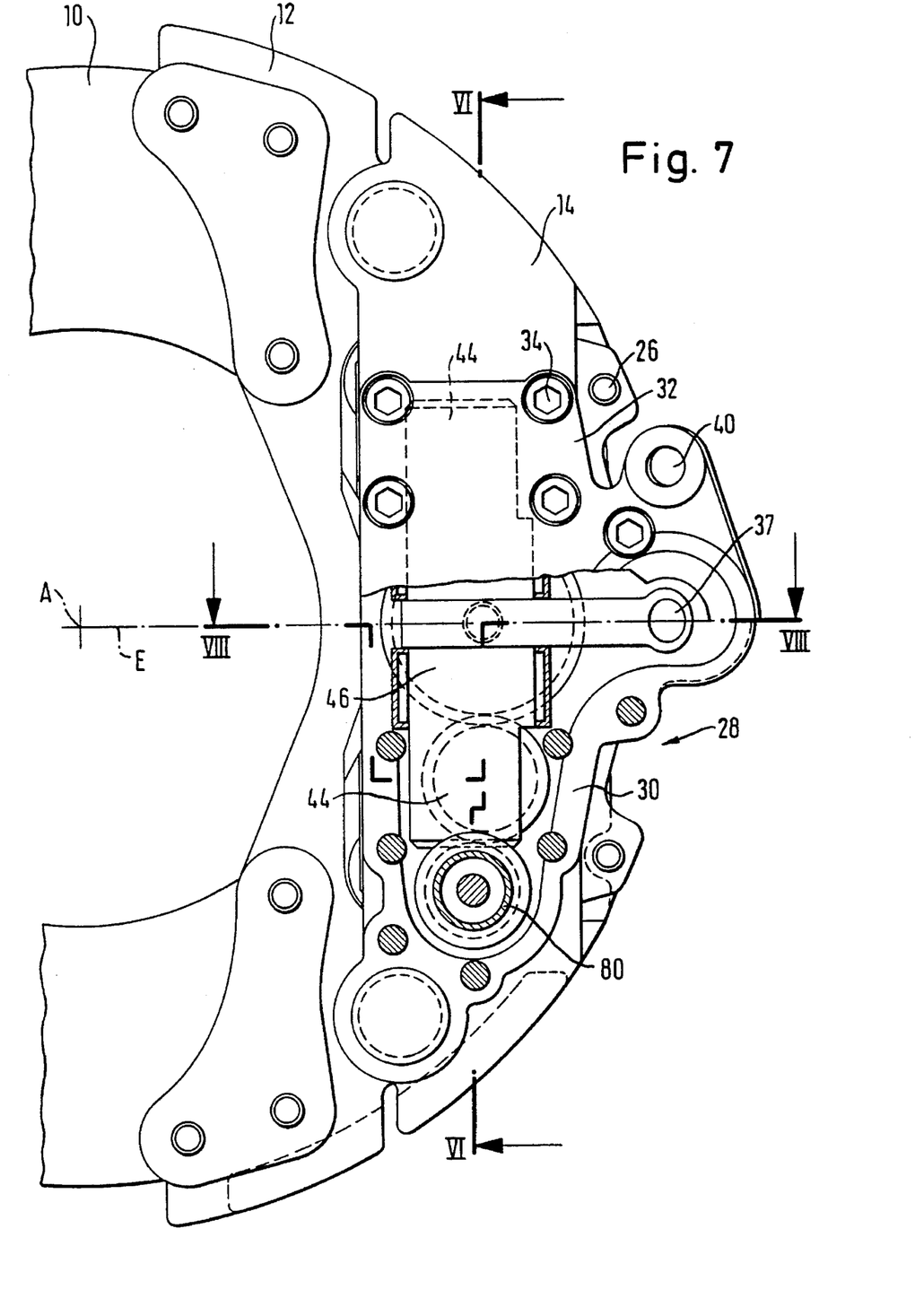
FIG. 7 is the corresponding lateral view, shown partly as section VII—VII in FIG. 6.
Figures 8, 9:
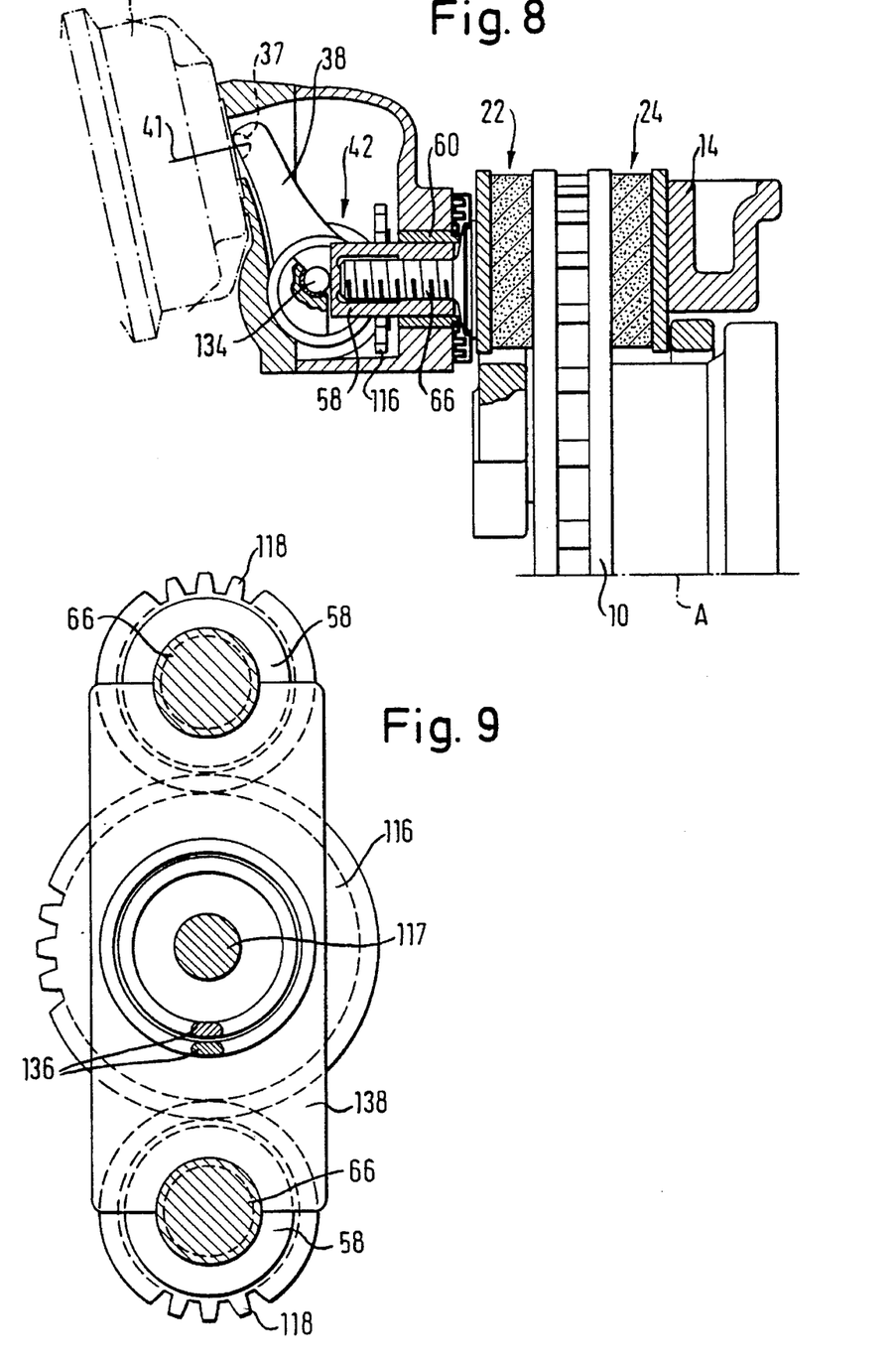
FIG. 8 shows section VIII—VIII of FIG. 7.
FIG. 9 shows section IX—IX of FIG. 6.

The rotary member 42 again comprises two eccentrics 44 which, however, are arranged in a terminal zone of the rotary member, acting through a cylindrical roller body 134 each on a respective one of the first threaded members 58. As shown in FIG. 6, the rotary member 42 is formed with a pair of journal pins 46 between the two eccentrics 44 which journal pins are supported in a depression 52 at the inside of the cover 32 of the casing through the outer ring 50 of a respective needle bearing 48 each—a disposition which conforms to the embodiment illustrated in FIGS. 1 to 5.

In a manner similar to the single first threaded member 58 provided according to FIGS. 1 to 5, the embodiment according to FIG. 6 has both first threaded members 58 connected to the rotary member 42 by a gear connection which comprises an angle drive and a coupling arrangement 90. Also with this embodiment the angle drive is formed by meshing bevel teeth 76 and 78. The coupling arrangement 90 as such in FIG. 6 is of similar design as in FIGS. 1 to 3. However, the pinion 100 according to FIG. 6 engages directly in the external toothing 118 on the adjacent first threaded member 58 and only then does an intermediate gear 116 follow which meshes with the external toothings 118 of both first threaded members 58.

The pin 117 which carries the intermediate gear 116 is located in the plane of symmetry E in FIG. 6, and its left end surface in FIG. 6 abuts without pressure against a cylindrical portion of the rotary member 42, whereby the latter is locked in position. The pin 117 is concentrically surrounded by a pair of compression springs 136 clamped between the casing 30 and an intermediate plate 138. The intermediate plate 138 is substantially rectangular, as may be seen in FIG. 9, yet formed with a semicircular recess in each of its small ends. By the edges of these recesses, the intermediate plate 138 presses at its face ends against a respective root zone of the toothing 118 at the two first threaded members 58. The compression springs 136 thus pressurize the two threaded members 58 in a direction away from the brake disc 10, pressing them instead against the corresponding roller body 134.

The embodiment illustrated in FIGS. 6 to 10 has the advantage, when compared to the embodiment of FIGS. 1 to 5, that the actuating forces generated by rotation of the rotary member 42 are distributed to the two adjustable tappets, each constituted by two threaded members 58 and 66, so that they act along the screw axes C' and C" thereof on the brake pad 22. The plate 74 shown in FIG. 1 can be dispensed with here since the distribution of forces is more advantageous from the start. Thus further axial installation space is saved. According to FIG. 10, the intermediate plate 138 is connected to the intermediate gear 116 by a locking ring 140 so that the two are axially displaceable together. This makes sure that the outer toothings 118 on the threaded members 58 will remain engaged over their full tooth width with the intermediate gear 116 even if the theaded members 58 are moved far to the right upon vigorous application of the brake.

Figure 10:
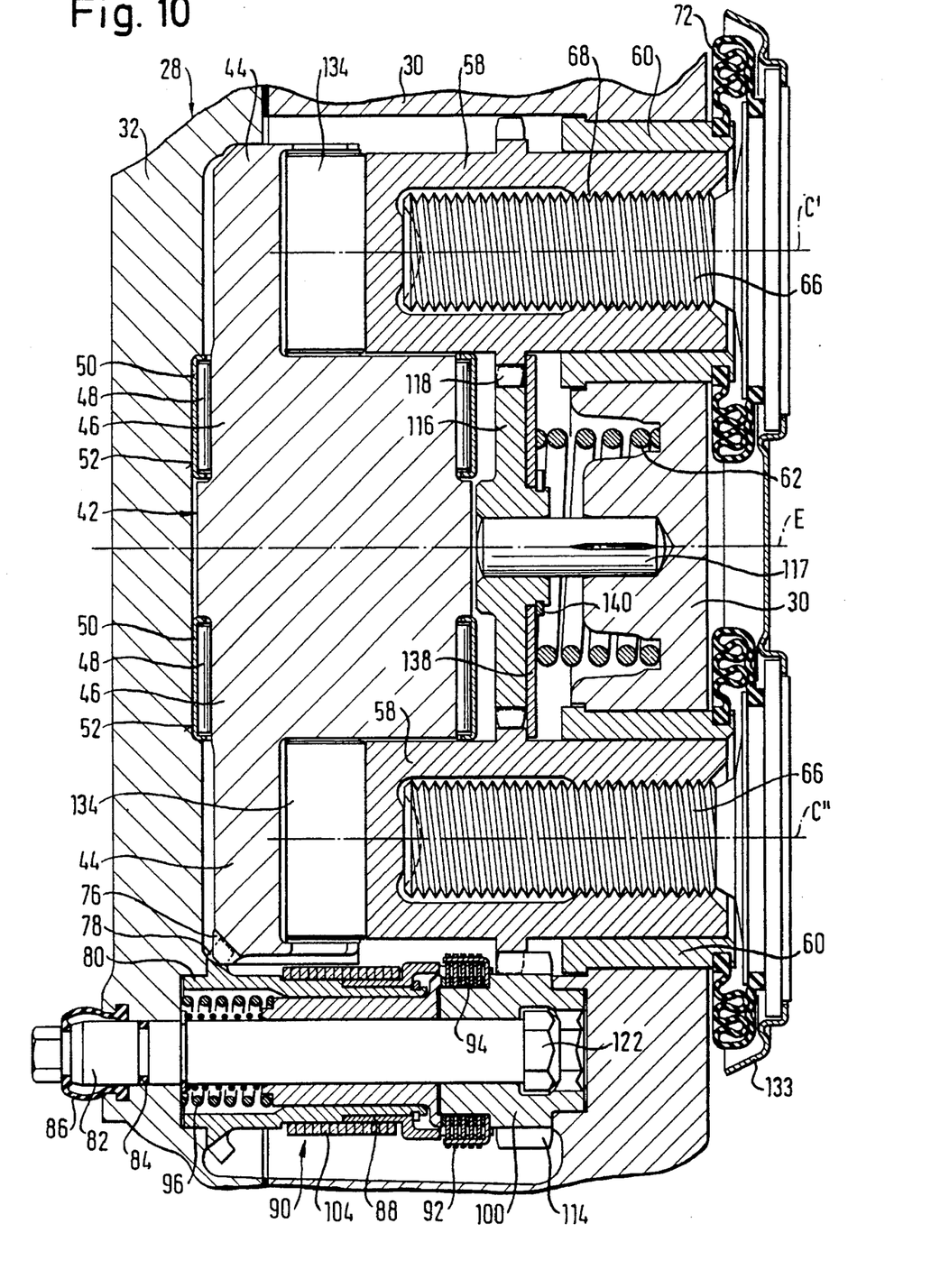
FIG. 10 is an enlarged cutout of FIG. 8 showing further details.

FIG. 10 further illustrates some details of the coupling arrangement 90 in an assembly which differs from the one shown in FIGS. 3 and 6. Specifically, sleeve 88 is supported on sleeve 80 and coupled to the same by the wrap spring 104. The discs 92, 94, on the other hand, are no longer provided to transmit torque between the sleeves 80 and 88 but instead between the sleeve 88 and the pinion 100. Thus the structural elements cooperating with the wrap spring 104—which means the two sleeves 80 and 88 according to FIG. 10—are withdrawn from being influenced by the forces of the compression springs 96 and 126 and, therefore, can be twisted with respect to each other against very little frictional resistance in a direction in which the wrap spring 104 is ineffective. As a result, the backward rotation of the rotary member 42 upon release of the brake is not obstructed noticeably by the coupling arrangement 90. For this reason the compression springs 136 (FIG. 6) or the compression spring 62 (FIGS. 1 and 10) can fulfill their task as return springs even if they cannot be particularly strong springs due to the limited space available for their installation.

We claim:

1. An actuating device with automatic readjustment on disc brakes, comprising:

a casing which is disposed axially beside a brake disc in built-in position;

a first threaded member which is supported in said casing for rotation about a screw axis (C, C', C") in parallel with an axis (A) of said brake disc;

a second threaded member which is fixed against rotation and connected to said first threaded member by a readjustment thread pair so that said first and second threaded members together form a longitudinally adjustable tappet for exerting an actuating force on a brake pad;

a rotary member which is rotatable about an axis of rotation (B) of its own for axially displacing said tappet by means of an actuator member;

a gear connection interconnecting said rotary member and said first threaded member, comprising a coupling arrangement which transmits a limited torque for readjustment of said brake pad;

said axis of rotation (B) of said rotary member being disposed at least approximately parallel to said brake disc;

said gear connection interconnecting said rotary member and said first threaded member having an angular drive;

said rotary member being at least approximately symmetrical with respect to a plane of symmetry (E) which contains said axis (A) of said brake disc; and the rotary member having a recess into which projects an end portion of said tappet which is remote from said brake pad.

2. The actuating device as claimed in claim 1, wherein a readjustable tappet each is arranged at both sides of said plane of symmetry (E), being axially displaceable by rotation of said rotary member and comprising said first threaded member and said second threaded member for joint exertion of an actuating force on said brake pad.

3. The actuating device as claimed in claim 2, wherein said gear connection has teeth formed at the coupling arrangement and at the first threaded member.

4. The actuating device as claimed in claim 3, wherein the readjustment thread pairs of the two tappets have the same course of thread with respect to each other, and the two first threaded members of both tappets are interconnected by an intermediate gear for synchronized rotation.

5. The actuating device as claimed in claim 1, wherein said rotary member comprises an eccentric each at both sides of the plane of symmetry (E).

6. The actuating device as claimed in claim 5, wherein a respective roller body is supported on each eccentric for power transmission to the corresponding threaded member.

7. The actuating device as claimed in claim 1, wherein said recess is located centrally in said rotary member.

8. The actuating device as claimed in claim 1 or 7, wherein said rotary member is supported at either side of said plane of symmetry (E) by a respective journal pin in a cover of said casing.

9. The actuating device as claimed in claim 1, wherein said angular drive is constituted by meshing bevel gear teeth with which said rotary member and said coupling arrangement are formed.

10. The actuating device as claimed in claim 1, wherein said gear connection has teeth formed at the coupling arrangement and at the first threaded member.

* * * * *

UNITED STATES PATENT AND TRADEMARK OFFICE
CERTIFICATE OF CORRECTION

PATENT NO. : 5,520,267
DATED      : May 28, 1996
INVENTOR(S): Wilfried GIERING, et al.

It is certified that error appears in the above-indentified patent and that said Letters Patent is hereby corrected as shown below:

On the title page, Item [22] should read:
 --[22] PCT Filed:  May 5, 1993--

Also, Item [30], the Foreign Application Priority Data, should read:
 --May 5, 1992   [DE] Germany......9206052.8
   Jun. 29, 1992 [DE] Germany......9208699.3--

Signed and Sealed this

Twentieth Day of August, 1996

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,520,267
DATED : MAY 28, 1996
INVENTOR(S) : WILFRIED GIERING, ET AL.

It is certified that error appears in the above-identified patent and that said Letters Patent is hereby corrected as shown below:

Column 2, line 5, "to be urged each of the brake disc"

should read   --to be urged respectively against a respective side of the brake disc--.

Signed and Sealed this

Thirty-first Day of March, 1998

*Attest:*

BRUCE LEHMAN

*Attesting Officer*   *Commissioner of Patents and Trademarks*